US009214662B2

(12) United States Patent
Nakano et al.

(10) Patent No.: US 9,214,662 B2
(45) Date of Patent: Dec. 15, 2015

(54) ELECTRODE MANUFACTURING METHOD

(71) Applicant: TOYOTA JIDOSHA KABUSHIKI KAISHA, Toyota-shi, Aichi (JP)

(72) Inventors: Takahiko Nakano, Seto (JP); Kenji Tsuchiya, Toyota (JP); Shuji Tsutsumi, Ikoma (JP); Tatsuya Hashimoto, Osaka (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 302 days.

(21) Appl. No.: 13/706,764

(22) Filed: Dec. 6, 2012

(65) Prior Publication Data

US 2013/0149466 A1   Jun. 13, 2013

(30) Foreign Application Priority Data

Dec. 9, 2011   (JP) ................. 2011-270531

(51) Int. Cl.
| B05D 3/06 | (2006.01) |
| H01M 4/04 | (2006.01) |
| H01M 4/70 | (2006.01) |
| H01M 10/0525 | (2010.01) |

(52) U.S. Cl.
CPC .............. *H01M 4/0404* (2013.01); *H01M 4/70* (2013.01); *H01M 10/0525* (2013.01); *Y02T 10/7011* (2013.01)

(58) Field of Classification Search
CPC .............. H01L 21/67028; H01L 21/67034; H01L 21/67098; H01L 21/67109; F26B 3/00; F26B 3/02; F26B 3/04; F26B 3/30; F26B 13/00; F26B 13/10
USPC ........................... 427/557, 541, 542, 379, 380
See application file for complete search history.

(56) References Cited

U.S. PATENT DOCUMENTS 2,673,230 A   3/1954   Brennan
3,630,802 A   12/1971   Dettling
(Continued)

FOREIGN PATENT DOCUMENTS

JP   08-038997   2/1996
JP   11-14250    1/1999
(Continued)

OTHER PUBLICATIONS

Flynn, et al., "Development and Experimental Results of Continuous Coating Technology for Lithium-Ion Electrodes," Yardney Technical Products, Inc., Jan. 13-16, 1998, pp. 81-84.
(Continued)

*Primary Examiner* — Michael Wieczorek
(74) *Attorney, Agent, or Firm* — Finnegan, Henderson, Farabow, Garrett & Dunner, LLP

(57) ABSTRACT

An electrode manufacturing method includes: a coating process of applying a coating material to a metal foil while the metal foil is fed forward to form a coated foil; and a drying process of drying the coated foil by heating while the coated foil is fed forward to pass through a drying oven of a drying machine placed in line on a feeding path. The drying oven includes at least a first drying chamber which the coated foil first passes through in the drying process and a second drying chamber which the coated foil passes through following the first drying chamber. The first drying chamber has a smaller area in cross section perpendicular to the feed direction along the feeding path than an area of the second drying chamber to provide a smaller volume than a volume of the second drying chamber.

12 Claims, 8 Drawing Sheets

(56) References Cited

U.S. PATENT DOCUMENTS

| | | | |
|---|---|---|---|
| 4,500,896 | A | 2/1985 | Kubo et al. |
| 4,816,098 | A | 3/1989 | Davis et al. |
| 4,822,643 | A | 4/1989 | Chou et al. |
| 5,621,983 | A | 4/1997 | Lundemann |
| 6,887,617 | B2 * | 5/2005 | Sato et al. .................. 429/128 |
| 7,514,384 | B2 | 4/2009 | Suzuki et al. |
| 2001/0044045 | A1 | 11/2001 | Sato et al. |
| 2012/0295037 | A1 | 11/2012 | Hagiwara et al. |

FOREIGN PATENT DOCUMENTS

| | | |
|---|---|---|
| JP | 2001-141365 | 5/2001 |
| JP | 2001-176502 | 6/2001 |
| JP | 2001-307716 | 11/2001 |
| JP | 2002-56841 | 2/2002 |
| JP | 2002-320898 | 11/2002 |
| JP | 2003-178752 | 6/2003 |
| JP | 2004-319117 | 11/2004 |
| JP | 2006107780 A * | 4/2006 |
| JP | 2007-141540 | 6/2007 |
| JP | 2009-193932 | 8/2009 |

OTHER PUBLICATIONS

Office Action for U.S. Appl. No. 13/471,681 mailed May 9, 2014.
Office Action for U.S. Appl. No. 13/471,681 dated Aug. 5, 2014.
Advisory Action for U.S. Appl. No. 13/471,681 dated Nov. 5, 2014.

* cited by examiner

FIG. 6

| | Volume ratio (%) | | Height (cm) | | Heating Method | | Differential Pressure (Pa) | | Roller Heating Temp. (°C) | Position of Feeding path | Peel Strength (N/m) |
|---|---|---|---|---|---|---|---|---|---|---|---|
| | 1st Drying Chamber | 2nd Drying Chamber | 1st Drying Chamber h1 | 2nd Drying Chamber h2 | 1st Drying Chamber | 2nd Drying Chamber | 1st Drying Chamber | 2nd Drying Chamber | | | |
| CEx 1 | 100 | 100 | 50 | 50 | Hot air | Hot air | -10 | -20 | Non-heating | Middle | 1 |
| CEx 2 | 100 | 100 | 50 | 50 | IR | Hot air | 5 | -20 | Non-heating | Middle | 1.4 |
| CEx 3 | 100 | 100 | 50 | 50 | Hot air | Hot air | -10 | -20 | 60 | Middle | 1.2 |
| CEx 4 | 100 | 100 | 50 | 50 | IR | Hot air | 5 | -20 | 60 | Middle | 1.7 |
| CEx 5 | 40 | 100 | 20 | 50 | Hot air | Hot air | -10 | -20 | Non-heating | Middle | 0.9 |
| CEx 6 | 40 | 100 | 20 | 50 | Hot air | Hot air | -10 | -20 | 60 | Middle | 1.1 |
| CEx 7 | 80 | 100 | 40 | 50 | IR | Hot air | 5 | -20 | 60 | Middle | 1.9 |
| CEx 8 | 40 | 100 | 20 | 50 | IR | Hot air | -20 | -20 | 60 | Middle | 3.1 |
| Ex 1 | 40 | 100 | 20 | 50 | IR | Hot air | 5 | -20 | 60 | Middle | 4.2 |
| Ex 2 | 50 | 100 | 25 | 50 | IR | Hot air | 5 | -20 | 60 | Middle | 4.1 |
| Ex 3 | 60 | 100 | 30 | 50 | IR | Hot air | 5 | -20 | 60 | Middle | 3.9 |
| Ex 4 | 40 | 100 | 20 | 50 | IR | Hot air | 0 | -20 | 60 | Middle | 4.2 |
| Ex 5 | 40 | 100 | 20 | 50 | IR | Hot air | 5 | -20 | Non-heating | Middle | 3.9 |
| Ex 6 | 60 | 100 | 30 | 50 | IR | Hot air | 5 | -20 | 60 | Upper | 4.1 |

(CEx: Comparative Example, Ex: Example)

FIG. 7

Peel Strength (N/m) of Coating Layer

| Heating Method of 1st Drying Chamber | Volume Ratio (%) of 1st Drying Chamber | Heating/Non-heating of Roller | |
|---|---|---|---|
| | | Heating | Non-heating |
| Hot Air | 100 | 1.2 | 1.0 |
| | 40 | 1.1 | 0.9 |
| IR | 100 | 1.7 | 1.4 |
| | 40 | 4.2 | 3.9 |

ELECTRODE MANUFACTURING METHOD

CROSS-REFERENCE TO RELATED APPLICATIONS

This application is based upon and claims the benefit of priority from the prior Japanese Patent Application No. 2011-270531 filed on Dec. 9, 2011, the entire contents of which are incorporated herein by reference.

BACKGROUND OF THE INVENTION

1. Field of the Invention

The present invention relates to a method of manufacturing an electrode to be used in a battery, the method being achieved by applying a paste-like coating material to a metal foil as it is fed forward to form a coated foil, and drying the coated foil formed with a coating layer or film as the coated foil is fed forward to pass through an oven of a drying machine arranged in line.

2. Related Art

In recent years, secondary batteries such as lithium ion batteries are used as power sources of for example a hybrid car, an electric vehicle, a cellular phone, a portable device, etc. In the case of manufacturing lithium ion batteries, this manufacturing process includes a coating process in which a feeding device feeds a metal foil (a current collector) in a flat form from a raw foil roll and a coating device applies a coating material ejected from a die onto the metal foil supported on a backup roller to form a coated foil. In a next drying process, the coated foil is dried by passing through an oven of a drying machine installed in line on a feeding path of the coated foil. The coating material is a paste-like coating solution prepared in advance before the coating process in such a manner that a plurality of active materials, binder resin for binding those active materials to each other and binding the active materials to a current collector, and others are mixed in a solvent (water or an organic solvent). In the case where the electrode is a positive electrode, the coating material contains a positive active material and also a conductive material imparting electric conductivity to the positive active material. In the case where the electrode is a negative electrode, the coating material contains a negative active material.

Meanwhile, in the drying process, when the coated foil is rapidly dried in the oven of the drying machine, the solvent contained in the coating layer evaporates, leading to cracks in a front surface of the coating layer. Further, the binder resin moves toward the front surface and is solidified during drying, causing migration in the coating layer. In case cracks or migration occur in the coating layer, a bonding strength of the coating layer to the current collector decreases. In subsequent processes following the drying process, accordingly, the coating layer may peel from the current collector. Such a battery is unusable as a product in terms of quality control. Examples of the drying process arranged to avoid the above problems are disclosed in Patent Documents 1 and 2.

FIG. 9 is a diagram to explain a drying process in Patent Document 1. In this document, as shown in FIG. 9, a drying oven 170 is partitioned into three areas 172, 174 and 176 continuously arranged along a feeding path. After a coating process, the coating layer formed on a current collector sheet 120 is dried as it is fed forward by a feeding device to pass through the first area 172 on an entrance side, the second area 174, and the third area 176 on an exit side in this order. The coating layer is dried by being exposed first to hot air of 100° C. and 90% RH or more by a heater 192 and a humidifier 100 in combination in the first area 172, to hot air of 120° C. in the second area 174, and then finally to hot air of 150° C. in the third area 176.

In Patent Document 2, when a sheet material applied with a resin solution is to be dried, hot water vapor (saturated vapor of about 100° C.) is sprayed in advance on the surface of the sheet material. Thus, a drying speed of the resin solution is adjusted to be almost equal to a drying speed that causes no migration.

RELATED ART DOCUMENTS

Patent Documents

Patent Document 1: JP-A-2004-319117
Patent Document 2: JP-A-11(1999)-14250

SUMMARY OF INVENTION

Problems to be Solved by the Invention

However, Patent Documents 1 and 2 have the following disadvantages. In Patent Document 1, in the first area 172 on the entrance side of the three areas in the drying oven, the hot air having an increased humidity of 90% RH or more is blown in advance to the coating layer to moisturize it. The drying machine needs the humidifier 100 for humidifying hot air and further a system for supplying water from a water supply source to the humidifier 100. The drying machine is therefore apt to be increased in size. Addition of the humidifier 100 also increases costs for humidification. In Patent Document 1, it is necessary to simultaneously control the humidity of the hot air in the first area 172 and the temperature of each of the second area 174 and the third area 176 according to the humidity of the first area 172 in order to prevent migration in the humidified coating layer. Thus, complicated control for temperature and humidity is required.

In Patent Document 2, hot water vapor is sprayed on the sheet material applied with the resin solution to humidify the sheet material. Accordingly, it is necessary to simultaneously control the humidity to the humidified sheet material and the temperature to heat the sheet material at a drying speed that causes no migration. As in Patent Document 1, therefore, complicated control for temperature and humidity is required.

The present invention has been made to solve the above problems and has a purpose to provide an electrode manufacturing method capable of manufacturing an electrode at low cost by efficiently drying a coated foil consisting of a metal foil and a paste-like coating material applied thereon while restraining migration.

Solution to Problem

To achieve the above purpose, one aspect of the invention provides an electrode manufacturing method including: a coating process of applying a coating material to a metal foil while the metal foil is fed forward to form a coated foil; and a drying process of drying the coated foil by heating while the coated foil is fed forward to pass through a drying oven of a drying machine placed in line on a feeding path, wherein the drying oven includes a plurality of drying chambers partitioned at a plurality of positions, the drying chambers including at least a first drying chamber which the coated foil first passes through in the drying process and a second drying chamber which the coated foil passes through following the first drying chamber, and the first drying chamber has a smaller area in cross section perpendicular to the feed direction along the feeding path than an area of the second drying chamber to provide a smaller volume of the first drying chamber than a volume of the second drying chamber.

Advantageous Effects of Invention

According to the above configuration, in the drying process following the coating process, the coated foil having a moist coating layer is fed into the heated drying chambers. At that time, the solvent (e.g., organic solvent, aqueous solvent, and others) contained in the coating material begins evaporating from the coating layer in the first drying chamber firstly. In each drying chamber including the first drying chamber, in the drying process, the flow of air flowing in/out of each drying chamber is in a constant state and the flow of air in each drying chamber is in an equilibrium state. Accordingly, when the volume of the first drying chamber is smaller than the volume of the second drying chamber because the first drying chamber is designed to be smaller in cross sectional area than the second drying chamber, the concentration of the solvent that evaporates in air in the first drying chamber becomes higher than the concentration of the solvent that evaporates in air in the second drying chamber. In the first drying chamber, therefore, as the concentration of evaporated solvent is higher, the solvent atmosphere in the chamber is saturated in a shorter time. In the first drying chamber, from this saturated state, the solvent remaining in the coating layer of the coated foil is prevented to evaporate from the front surface of the coating layer. Thus, even when the coated foil passes through the first drying chamber in the heated atmosphere, the moist coating layer is less likely to be immediately dried in the first drying chamber. This can restrain the occurrence of migration resulting from rapid drying of the coating layer.

Specifically, the coating layer of the coated foil is made of a paste-like coating solution prepared before the coating process in such a manner that a plurality of active materials (positive active materials for a positive electrode or negative active materials for a negative electrode), a binder resin for binding those active materials to each other or binding the active materials to the metal foil, and others are mixed in a solvent (water or organic solvent). When the coated foil (coating layer) is fed into the drying oven under heated atmosphere, the solvent contained in the coating layer evaporates and thus the concentration of the atmosphere in the first drying chamber gradually increases due to the evaporated solvent and then approaches a saturated state.

On the other hand, when the coated foil is fed into the drying oven under heated atmosphere, the solvent contained in the coating layer evaporates and simultaneously the active materials are bound to each other and the active materials and the metal foil are bound to each other by the binder resin. Thus, the coating layer in a dried state is obtained. While the coated foil first passes through the first drying chamber, the solvent existing in the coating layer on a front surface side first begins evaporating, so that the concentration of the solvent on the front surface side gradually decreases. On the other hand, the concentration of the solvent existing in the coating layer on an opposite side to the front surface, in a thickness direction of the coating layer and near an interface between the metal foil and the coating layer, remains close to an initial concentration given before the coated foil enters the first drying chamber. Thus, a difference in solvent concentration occurs between the front surface side and the back surface side of the coating layer.

When the coating layer is dried at a rapid drying speed that causes a large difference in solvent concentration in a short time, the solvent remaining in the coating layer on the back surface side is likely to rapidly evaporate due to the atmosphere in the drying chamber. In association with this rapid evaporation of solvent, the binder resin existing in the coating layer on the back surface side also moves toward the front surface side. When the solvent remaining in the coating layer on the back surface side finishes evaporating, the binder resin having moved to the front surface side is solidified on the front surface side. In the coating layer, therefore, migration is caused by the binder resin between the front surface side and the back surface side. The occurrence of migration deteriorates the bonding strength between the metal foil and the coating layer (active materials and others), particularly, in the interface between the metal foil and the coating layer.

In the aforementioned electrode manufacturing method, the concentration of the solvent that evaporates in air in the first drying chamber is higher than the concentration of the solvent that evaporates in air in the second drying chamber. In the first drying chamber, as the concentration of evaporated solvent is higher, the solvent atmosphere in the chamber becomes saturated in a short time. In the first drying chamber, from this saturated state, the solvent remaining in the coating layer of the coated foil is prevented from evaporating from the front surface of the coating layer. Accordingly, lowering of the concentration of solvent remaining in the coating layer on the front surface side is reduced. The concentration of solvent remaining in the coating layer on the back surface side can also be easily maintained close to an initial concentration given before the coated foil enters the first drying chamber. Even when the coated foil enters the first drying chamber, therefore, a difference in solvent concentration can be reduced between the solvent remaining on the front surface side and the solvent remaining on the back surface side in the coating layer.

As above, since the difference in solvent concentration is reduced between the front surface side and the back surface side in the coating layer, the coating layer of the coated foil fed into the first drying chamber can be dried at a slow drying speed. This can prevent the binder resin in the coating layer on the back surface side from moving toward the front surface side as the solvent remaining on the back surface side rapidly evaporates. Specifically, it is possible to prevent the occurrence of migration in the coating layer that is caused when the binder resin having moved to the front surface side in the coating layer is solidified by rapid evaporation of the solvent remaining on the back surface side in the coating layer. Thus, a decrease in the bonding strength between the metal foil and the coating layer (active materials and others) can be restrained.

Even when the coated foil passes through the first drying chamber under the heated atmosphere, the moist coating layer is less likely to be dried rapidly in the first drying chamber. This can prevent the occurrence of migration resulting from rapid drying of the coating layer. In particular, the electrode manufacturing method configured as above can prevent the occurrence of migration irrespective of which the electrode is a positive electrode or a negative electrode and irrespective of the kind of solvent.

Furthermore, the first drying chamber is designed to have a cross sectional area smaller than a cross sectional area of at least the second drying chamber without setting a total length (an interior length) in the feed direction to be shorter than a total length (an interior length) of at least the second drying chamber, to provide the volume of the first drying chamber smaller than the volume of at least the second drying chamber. This is to avoid a situation that the time to pass the coated foil through the first drying chamber is shorter than the time needed to effectively heat the coating layer. Efficient heating and drying of the coating layer can therefore be conducted.

Conventionally, the coating layer is moisturized and then dried by hot air to prevent migration. The drying machine thus needs the humidifier in addition to the drying oven and also requires complicated control of the temperature and humidity in the drying machine during drying of the coating layer. In contrast, the electrode manufacturing method configured as above does not need to humidify the coating layer. For instance, it is only necessary to control the temperature of the first drying chamber. Thus, the control needed to dry the coating layer is not complicated. Since it is not necessary to humidify the coating layer, the drying machine needing no humidifier can be reduced in size, needing no extra cost for humidification, thus enabling drying of the coating layer at low cost.

According to the electrode manufacturing method configured as above, consequently, it is possible to manufacture the electrode at low cost by efficiently drying the coated foil consisting of the metal foil applied with a paste-like coating material while preventing the occurrence of migration.

BRIEF DESCRIPTION OF THE DRAWINGS

FIG. 3 is a cross sectional view taken along a line B-B in FIG. 1, showing the inside of a first drying chamber which the coated foil passes through;

FIG. 4 is a cross sectional view taken along a line C-C in FIG. 1, showing the inside of a second drying chamber which the coated foil passes through;

FIG. 6 is a table showing setting conditions and peel strength of coating layers in Examples 1 to 6 of the electrode manufacturing method of the embodiment and Comparative examples 1 to 8;

FIG. 7 is a table showing the measurement results in Examples 1 and 5 and Comparative examples 1 to 6 extracted from FIG. 6 in terms of the peel strength of coating layers;

DESCRIPTION OF EMBODIMENTS

Figure 1:
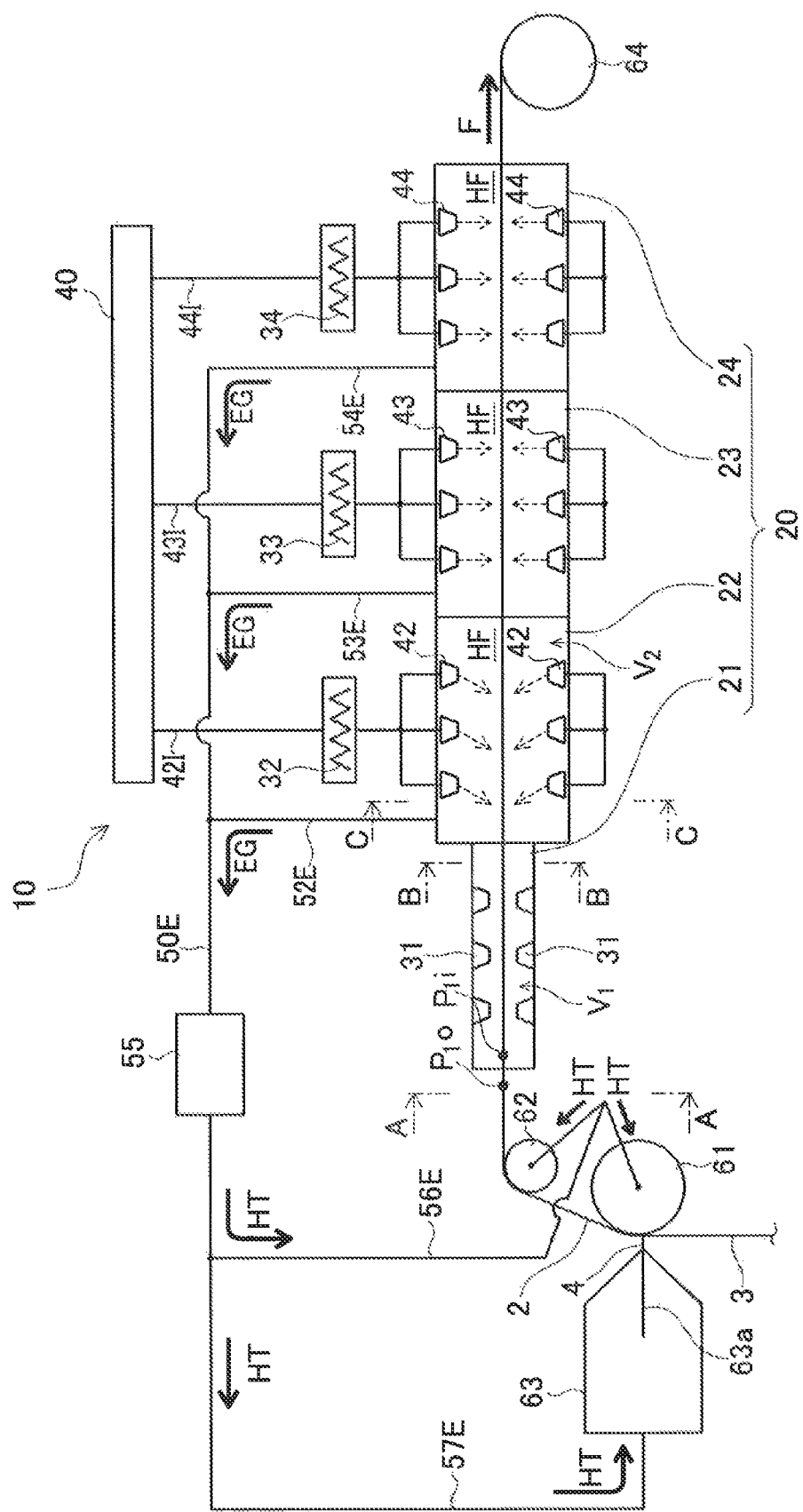
FIG. 1 is a schematic diagram to typically explain a drying process of an electrode manufacturing method of an embodiment.
Figure 2:
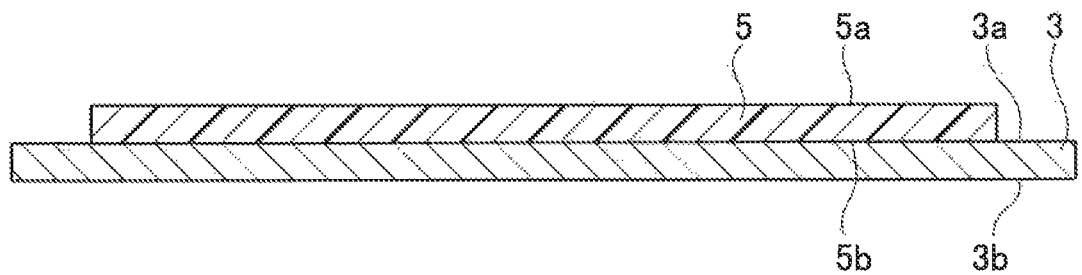
FIG. 2 is a cross sectional view of a coated foil taken along a line A-A in FIG. 1 in the embodiment.

A detailed description of a preferred embodiment of the present invention will now be given referring to the accompanying drawings. The present embodiment is directed to an electrode of a secondary battery such as a lithium ion battery to be used as a drive power source of a hybrid car, an electric vehicle, and others. Of a manufacturing process of this electrode, a coating process and a drying process will be explained below. FIG. 1 is a schematic view to typically explain the drying process of the electrode manufacturing method of the present embodiment. FIG. 2 is a cross sectional view of a coated foil taken along a line A-A in FIG. 1 in the present embodiment.

Firstly, a coated foil 2 is briefly explained. The coated foil 2 is made of a metal foil 3 and a coating material 4 and will be produced as an electrode 1 via predetermined manufacturing processes. In the case where the electrode 1 is a positive electrode, the coating material 4 is a paste-like coating solution prepared before a coating process in such a manner that a plurality of positive active materials, a conductive material imparting electric conductivity to the positive active materials, a binder resin for binding the positive active materials to each other and binding the positive active materials and the conductive material and the metal foil 3 (current collector), and others are mixed in a solvent (water or organic solvent). In the case where the electrode 1 is a negative electrode, the coating material 4 is a paste-like coating solution prepared before the coating process in such a manner that a plurality of negative active materials, a binder resin for binding the negative active materials and binding the negative active materials to the metal foil 3 (current collector), and others are mixed in a solvent (water or organic solvent).

The coating process is explained below. In this coating process, the coating material 4 is applied on the metal foil 3 while being fed forward to form a coated foil 2. To be concrete, the metal foil 3 is wound over a backup roller 61 and a feed roller 62 as shown in FIG. 1 and is moved forward by a reel-out part of a feeding device not shown to be fed forward in a feed direction F toward a take-up part 64. The backup roller 61 is placed in a position facing a die slit 63a of a die 63 with a predetermined clearance therefrom while interposing the metal foil 3 therebetween. In the coating process, while the metal foil 3 is fed forward at a predetermined speed, the coating material 4 supplied to the die 63 is injected at a constant flow rate through the die slit 63a onto a surface 3a to be coated ("coated surface"), which is one surface of the metal foil 3. At that time, the other surface of the metal foil 3, i.e., an uncoated surface 3b, is supported on the outer periphery of the backup roller 61 as shown in FIGS. 1 and 2. Accordingly, the coating material 4 is applied by a predetermined thickness (a vertical size in FIG. 2) on the coated surfaced 3a of the metal foil 3. Thus, the coated foil 2 in which a coating layer 5 is formed on the coated surface 3a of the metal foil 3 is obtained.

Next, the drying process is explained. In the drying process, the coated foil 2 moved in the feed direction F by the feeding operation of the reel-out part is dried by heating while passing through a drying oven 20 of a drying machine 10 placed in line along a feeding path as shown in FIG. 1.

The drying machine 10 mainly includes the drying oven 20 and an air supply part 40. In the present embodiment, the drying oven 20 consists of four drying chambers (a first drying chamber 21, a second drying chamber 22, a third drying chamber 23, and a fourth drying chamber 24) partitioned by three positions as shown in FIG. 1. The first to fourth drying chambers 21-24 are divided from adjacent ones so that respective openings are provided on the feeding path to keep the atmosphere in each drying chamber as constant as possible and not to interfere with the coated foil 2 under movement.

Figure 3:
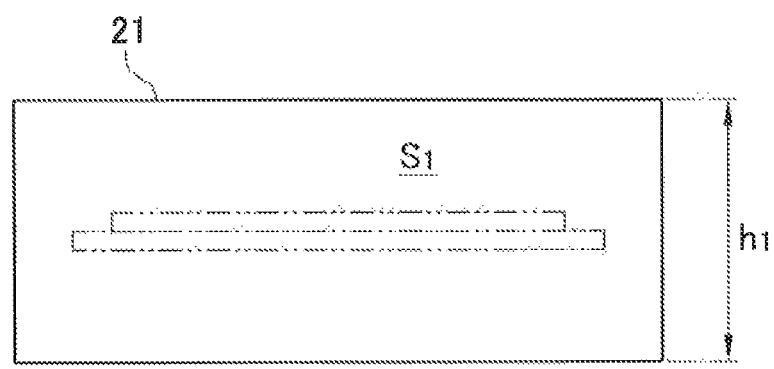
Figure 4:
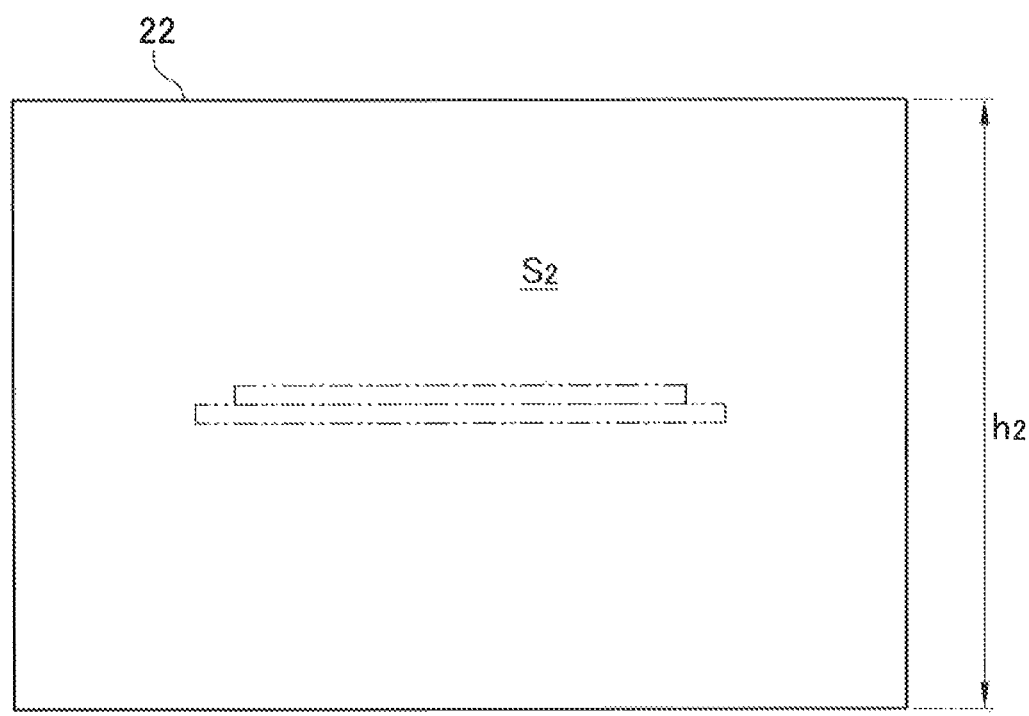

The first drying chamber 21 is a drying chamber through which the coated foil 2 firstly passes in the drying process. The second drying chamber 22 is a drying chamber through which the coated foil 2 secondly passes. FIG. 3 is a cross sectional view taken along a line B-B in FIG. 1, showing the inside of the first drying chamber 21 through which the coated foil passes. FIG. 4 is a cross sectional view taken along a line C-C in FIG. 1, showing the inside of the second drying chamber 22 through which the coated foil passes.

The first to fourth drying chambers 21-24 are designed with the same inside length in the feed direction F. Specifically, the first drying chamber 21 and the second drying chamber 22 are designed as shown in FIGS. 3 and 4 so that the cross sectional area S1 of the first drying chamber 21 in a direction perpendicular to the feed direction F along the feeding path is smaller than the cross sectional area S2 of the second drying chamber 22 to provide the volume V1 of the first drying chamber 21 smaller than the volume V2 of the second drying chamber 22.

In the first drying chamber 21, infrared heaters 31 are arranged on both a ceiling and a floor (an upper side and a lower side in FIG. 1) to uniformly irradiate infrared rays over the entire of a front surface (upper surface in FIG. 2) 5a of the coating layer 5 and the entire of an uncoated surface (lower surface in FIG. 2) 3b of the metal foil 3 of the coated foil 2 shown in FIG. 2. In the drying process, while the coated foil 2 continuously fed forward passes through the first drying chamber 21, the coated foil 2 is heated at a high temperature of 300° C. or more by the infrared heaters 31 under an atmosphere supplied with no hot air.

The opening of the first drying chamber 21 on an upstream side (left side in FIG. 1) is provided in such a size as not to interfere with the coated foil 2 during movement to satisfy one of the following conditions (i) and (ii):
(i) a differential pressure is zero between the internal pressure inside the first drying chamber 21 (Internal pressure $P_1i$ of the first drying chamber) and the external pressure outside and upstream adjacent to the first drying chamber 21 (External pressure $P_1o$ of the first drying chamber); and (ii) the internal pressure $P_1i$ of the first drying chamber 21 is higher than the external pressure $P_1o$ of the first drying chamber 21 in the range of allowable error. The "range of allowable error" is directed to slight errors that occur, between inside and outside the first drying chamber 21, due to for example variations in density distribution of air layer, variations in temperature distribution of air layer, man-induced measurement errors, and others. The range represents an acceptable range of the error that falls in such a degree as not to affect the evaporation speed of the solvent that evaporates from the coated foil 2, for example, a range of no more than 10 Pa.

In the second, third, and fourth drying chambers 22, 23, and 24, respectively, air-blowing nozzles 42, 43, and 44 are placed on both a ceiling and a floor in each chamber to blow hot air onto the coated foil 2, i.e., the entire front surface 5a of the coating layer 5 and the entire uncoated surface 3b of the metal foil 3. In the drying process, in the second drying chamber 22 and subsequent drying chambers, i.e., in the second to fourth drying chambers 22-24, the coated foil 2 having passed through the first drying chamber 21 is exposed to the atmosphere supplied with hot air HF.

To be more concrete, the air supply part 40 includes an air blowing device such as an air blower to supply air at ordinary temperatures under control of air volume to the air-blowing nozzle 42 in the second drying chamber 22, the air-blowing nozzle 43 in the third drying chamber 23, and the air-blowing nozzle 44 in the fourth drying chamber 24 through air supply pipes 42I, 43I, and 44I respectively connected to the corresponding nozzles 42-44. A heater 32 is placed on the air supply pipe 42I, a heater 33 is placed on the air supply pipe 43I, and a heater 34 is placed on the air supply pipe 44I.

The air supplied from the air supply part 40 is heated by the heater 32 to a predetermined set temperature and then the heated air is blown as hot air into the second drying chamber 22 through the air-blowing nozzle 42. Similarly, the air supplied from the air supply part 40 is heated by the heater 33 to a predetermined set temperature different from the set temperature by the heater 32 and then the heated air is blown as hot air into the third drying chamber 23 through the air-blowing nozzle 43. Similarly, the air supplied from the air supply part 40 is heated by the heater 34 to a predetermined set temperature different from the set temperatures by the heaters 32 and 33 and then the heated air is blown as hot air into the fourth drying chamber 24 through the air-blowing nozzle 44.

The rollers used for feeding, i.e., the backup roller 61 contacting with the metal foil 3 and the feed roller 62 contacting with the coated foil 2 are individually heated by exhaust heat HT of the air discharged from the second to fourth drying chambers 22-24 supplied therein with hot air. Thus, the coated foil 2 is preheated by the heat stored in the backup roller 61 and the feed roller 62.

On the other hand, an exhaust pipe 52E is connected to the second drying chamber 22 to exhaust air from the second drying chamber 22 in association with supply of air from the nozzle 42. Similarly, an exhaust pipe 53E is connected to the third drying chamber 23 to exhaust the air from the third drying chamber 23 in association with the supply of air from the nozzle 43. Similarly, an exhaust pipe 54E is connected to the fourth drying chamber 24 to exhaust the air from the fourth drying chamber 24 in association with the supply of air from the nozzle 44.

The exhaust pipes 52E, 53E, and 54E are connected in parallel to the exhaust pipe 50E, so that exhaust air EG from the second to fourth drying chambers 22-24 is supplied to an input side of a known heat exchanger 55 through the exhaust pipe 50E. An output side of the heat exchanger 55 is connected to exhaust heat paths 56E and 57E. The exhaust heat path 56E is connected in parallel to the core member of the backup roller 61 and the core member of the feed roller 62 to transmit the exhaust heat HT of the exhaust air EG output from the heat exchanger 55 to the core member of the backup roller 61 and the core member of the feed roller 62 respectively.

In the present embodiment, the exhaust heat path 57E is connected to the die 63 to utilize the exhaust heat HT of the exhaust air EG to heat the coating material 4 to be ejected out through the die slit 63a. Accordingly, when the coating material 4 is to be applied on the surface 3a of the metal foil 3, the coating material 4 can be ejected at a high temperature through the die slit 63a. This increased temperature of the coating material 4 lowers the viscosity of the coating material 4 during a coating work. Thus, the coated foil 2 formed with the coating layer 5 with uniform coating thickness (coating weight) on the coated surface 3a can be obtained.

Figure 5:
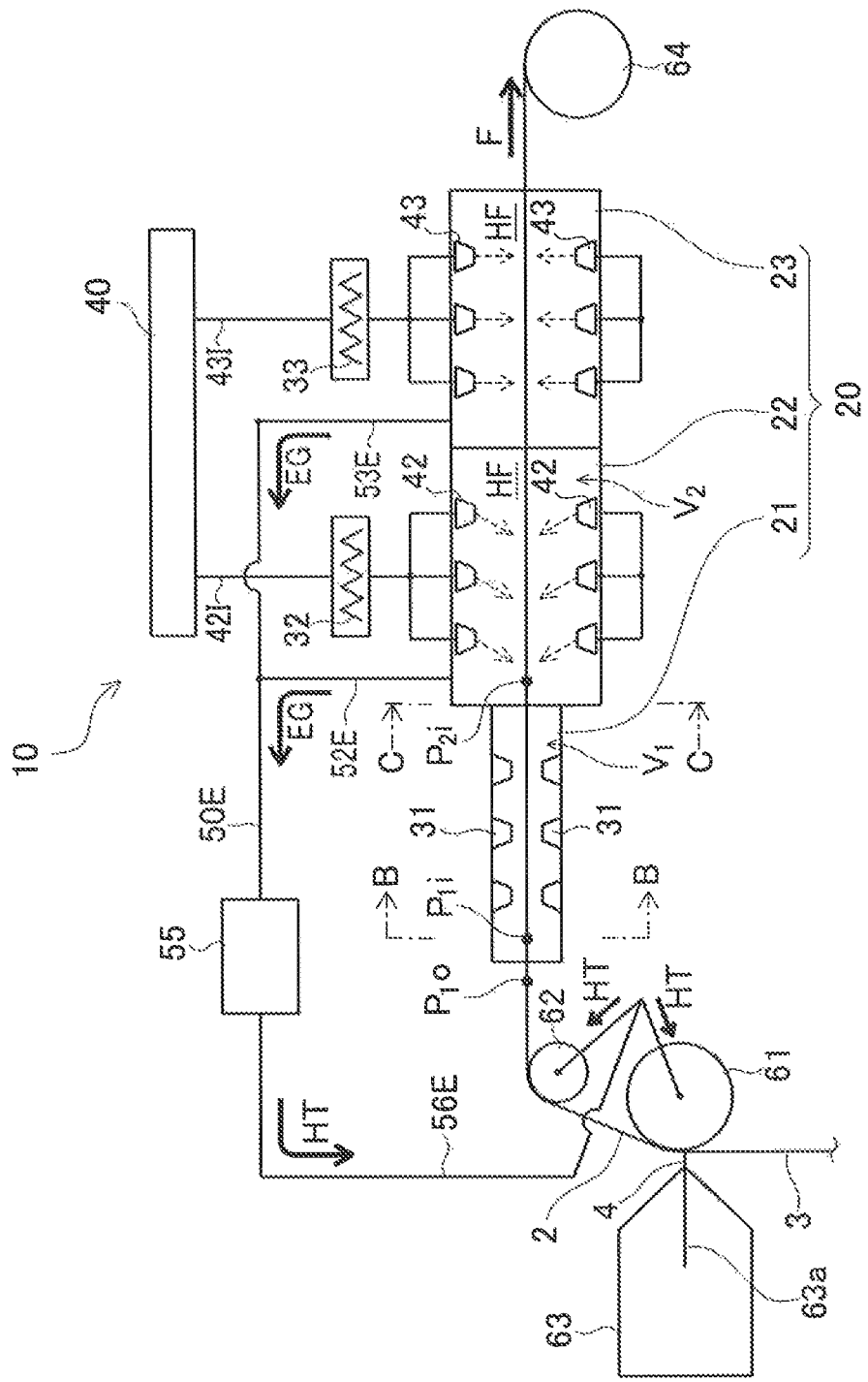
FIG. 5 is a schematic diagram to explain Examples 1 to 6 of the electrode manufacturing method.

For verification of significance of the electrode manufacturing method in the present embodiment, Examples 1 to 6 and Comparative examples 1 to 8 were checked. This check and verification will be explained below referring to FIGS. 5 and 6. FIG. 5 is a schematic diagram to explain the electrode manufacturing method in Examples 1 to 6. FIG. 6 is a table showing setting conditions in drying process and peel strength of coating layers in Examples 1 to 6 of the electrode manufacturing method of the present embodiment and Comparative examples 1 to 8.

Common conditions for the check in Examples 1 to 6 and Comparative example 1 to 8 are first explained. The common conditions are as below.

<Common Condition>
A. Coated Foil
(1) Polarity of an electrode to be manufactured: Negative electrode
(2) Component ratio of coating material:
  Negative active material:CMC:Binder SBR=98.3:0.7:1
(3) Solvent: Water
(4) Paste solid content rate: 54%

(5) Coating surface: One side of a metal foil 3
    Coating weight: 95 g/m²
(6) Coating speed: 10 m/min
B. Drying Chamber
(7) The number of chambers: Three chambers ($1^{st}$ to $3^{rd}$ chambers 21-23),
    The length of each chamber: 4 m
(8) Height of $2^{nd}$ drying chamber 22: h2 in FIG. 4=50 cm
(9) Atmosphere temperature: 350° C. in $1^{st}$ drying chamber 21,
    110° C. in $2^{nd}$ drying chamber 22,
    130° C. in $3^{rd}$ drying chamber 23
(10) Pressure difference (Differential pressure) between inside and outside $2^{nd}$ drying chamber 22:
    Internal pressure $P_2i$ is lower by 20 Pa than External pressure $P_1o$.
(11) Pressure difference (Differential pressure) between inside and outside $3^{rd}$ drying chamber 23:
    Internal pressure is lower by 10 Pa than External pressure.
(12) Hot air: Supplied ($2^{nd}$ drying chamber 22 and $3^{rd}$ drying chamber 23)
    <Different Conditions>
B. Drying Chamber
(13) Heat source of $1^{st}$ drying chamber 21:
    Infrared heater 31 ("IR" in FIG. 6 and others) or Hot air
(14) Temperature of $1^{st}$ drying chamber 21 supplied with hot air: 90° C.
(15) Height of $1^{st}$ drying chamber 21:
    h1 in FIG. 3=20 cm, 25 cm, 30 cm, 40 cm, and 50 cm
(16) Pressure difference (Differential pressure) between inside and outside drying chamber 21:
    Internal pressure $P_1i$ is equal to External pressure $P_1o$,
    Internal pressure $P_1i$ is lower by 10 or 20 Pa than External pressure $P_1o$,
    Internal pressure $P_1i$ is higher by 5 Pa than External pressure $P_1o$.
C. Other Conditions
(17) Heating/Non-heating of rollers (backup roller 61 and feed roller 62) by exhaust heat HT: Heating (60° C.) or Non-heating
(18) Position of a feeding path of a coated foil:
    At a middle in a height direction in each drying chamber ("Middle" in FIG. 6),
    At a position by 7 cm below an uppermost end in the height direction in each drying chamber ("Upper" in FIG. 6).

An evaluation method of check and verification will be explained below. For the evaluation of check and verification, the coated foil 2 after drying is sampled to prepare test pieces. An adhesive member such as a tape having an adhesive surface is stuck to the front surface 5a of the coating layer 5 in each test piece. After sticking, external force is applied in a direction to separate the adhesive member and the metal foil 3 from each other. The magnitude of the external force (peel strength N/m) is measured in each test piece per unit length when the coating layer 5 is separated or peeled from the coated surface 3a of the metal foil 3.

In the present embodiment, the check and verification is evaluated, good or bad, based on the peel strength of the order of 2.0 N/m. As a value of peel strength is larger than 2.0 N/m, the bonding strength between the metal foil 3 and the coating layer 5 is higher so that the coating layer 5 reliably tightly sticks to the metal foil 3. The high bonding strength between the metal foil 3 and the coating layer 5 represents that binder resin contained in the solvent of the coating material 4 does not move toward and solidify in the front surface 5a side of the coating layer 5, so that the coating layer 5 is gradually dried uniformly during the drying process of the coated foil 2. Accordingly, it means that the coating layer 5 of the coated foil 2 (the electrode 1) is less likely to cause migration resulting from rapid drying of the coating layer of the coated foil.

Results of the check and verification are shown in FIGS. 6 and 7. FIG. 7 is a table showing the measurement results in Examples 1 and 5 and Comparative examples 1 to 6 extracted from FIG. 6 in terms of the peel strength of coating layers.

As easily seen from the table in FIG. 6, the results of check and verification on Comparative examples 1 to 7 reveal that the peel strength in each example is less than 2.0 N/m which is an evaluation criteria. On the other hand, the results on Examples 1 to 6 and Comparative example 8 reveal that the peel strength in each example is 1.5 to 2 times larger than the evaluation criteria, 2.0 N/m.

The results of check and verification are studied below. Comparing between Comparative examples 1 and 3 made under the same check conditions excepting heating/non-heating of the rollers, the peel strength in Comparative example 3 with the rollers heated is larger by 20% than the peel strength in Comparative example 1 with the rollers unheated. This is conceivably because, in the first drying chamber 21 and the second drying chamber 22, the coating layer 5 is heated from the front surface 5a side and further the heat deriving from the exhaust heat HT is transmitted from the back surface 5b side to the coating layer 5 via the metal foil 3 while the coated foil 2 is fed by the backup roller 61 and the feed roller 62, and therefore the coating layer 5 is uniformly heated.

Comparing between Comparative examples 3 and 6 made under the same check conditions excepting the volume ratio of the first drying chamber 21, the peel strength is little different between Comparative examples 3 and 6. In Comparative examples 3 and 6, specifically, simply reducing the volume of the first drying chamber 21 could not remarkably increase the peel strength. Comparing Comparative examples 6 and 8 made under the same check conditions excepting the heating method in the first drying chamber 21 and the differential pressure of the first drying chamber 21, the peel strength in Comparative example 8 is 3.1 N/m which is about three times as large as the peel strength of 1.1 N/m in Comparative example 6. A key factor of this result in Comparative example 8 is in heating of the first drying chamber 21 by the infrared heaters 31. This verifies that heating using the infrared heaters 31 is significant. The advantages of using the infrared heaters 31 will be mentioned later.

As another factor, the difference in differential pressure in the first drying chamber 21 is also conceived. Comparing between Comparative example 8 and Example 1 made under the same check conditions excepting the differential pressure of the first drying chamber 21, the peel strength in Example 1 is 4.2 N/m which is larger by 30% or more than the peel strength of 3.1 N/m in Comparative example 8. This seems because, the internal pressure $P_1i$ in Example 1 is higher by 5 Pa than the external pressure $P_1o$, so that low-temperature air outside the first drying chamber 21 does not flow into this chamber 21, and thus the atmosphere in the first drying chamber 21 is maintained.

Comparing between Examples 3 and 6 made under the same check conditions excepting the position of the feeding path of the coated foil, since the coated foil 2 includes the coating layer 5 on the upper surface of the metal foil 3, the distance between the coating layer 5 and the infrared heaters 31 is shorter in Example 6 than in Example 3. Accordingly, in Example 6, the coating layer 5 efficiently absorbs the infrared rays emitted from the infrared heaters 31 and is heated. In Example 6, furthermore, the cross section S1 of the first drying chamber 21 is divided roughly into upper and lower with respect to the coated foil 2 moving forward through the first drying chamber 21 in the drying process, so that the volume of an upper space above the coated foil 2 in the first drying chamber 21 is substantially smaller than the volume of a lower space below the coated foil 2. In this regard, the solvent is less likely to be rapidly dried from the front surface 5a side and thus the peel strength in Example 6 is higher than the peel strength in Example 3.

The above study on the check results reveals, as seen in FIGS. 6 and 7, that the coated foil 2 having a large peel strength can be obtained when the following four conditions are satisfied:

(a) The infrared heaters 31 (IR) are used as a heating method for the first drying chamber 21;
(b) The ratio of the volume of the first drying chamber 21 to that of the second drying chamber 22 is set to 60% or less;
(c) The backup roller 61 and the feed roller 62 are heated by the exhaust heat HT, and
(d) The internal pressure $P_1i$ of the first drying chamber 21 is equal to or higher by about 5 Pa than the external pressure $P_1o$.

Operations and advantageous effects of the electrode manufacturing method in the present embodiment configured as above will be explained below.

The electrode manufacturing method in the present embodiment includes the coating process of coating the coating material 4 on the metal foil 3 as it is fed to form the coated foil 2, and the drying process of drying the coated foil 2 by heating while the coated foil 2 is fed to pass through the drying oven 20 of the drying machine 10 installed in line on the feeding path. In this electrode manufacturing method, the drying oven 20 includes four drying chambers (the first to fourth drying chambers 21-24) partitioned at a plurality of positions (three positions in the present embodiment). The drying oven 20 in aforementioned Examples includes three drying chambers (the first to third drying chambers 21-23) partitioned at two positions. The drying chambers include at least the first drying chamber 21 which the coated foil 2 firstly passes through in the drying process and the second drying 22 which the coated foil 2 passes through following first drying chamber 21. In the cross section perpendicular to the feed direction F along the feeding path, the area of the cross section S1 of the first drying chamber 21 is designed to be smaller than the area of the cross section S2 of the second drying chamber 22. Accordingly, the volume V1 of the first drying chamber 21 is smaller than the volume V2 of the second drying chamber 22. Therefore, when the coated foil 2 with the coating layer 5 in a moist state after the coating process is moved into the first drying chamber 21 under heating, in the drying process, the solvent (e.g., organic-solvent based solvent, water based solvent, etc.) contained in the coating material 4 begins evaporating first from the coating layer 5 in the first drying chamber 21.

At that time, in each drying chamber such as the first to third drying chambers 21 to 23, in the drying process, the flow of air flowing in/out of each drying chamber is in a constant state and the flow of air in each drying chamber is an equilibrium state. Thus, since the area of the cross section S1 is set to be smaller than the area of the cross section S2, thereby making the volume V1 of the first drying chamber 21 smaller than the volume V2 of the second drying chamber 22, the concentration of the solvent that evaporates in air in the first drying chamber 21 becomes higher than the concentration of the solvent that evaporates in air in the second drying chamber 22.

In the first drying chamber 21, as the concentration of evaporated solvent is higher, the atmosphere created by the solvent in the chamber is saturated in a short time. In the first drying chamber 21, from this saturated state, the solvent remaining in the coating layer 5 of the coated foil 2 can be prevented from evaporating from the front surface 5a of the coating layer 5. Even when the coated foil 2 passes through the first drying chamber 21 under the heated atmosphere, the coating layer 5 in a moist state is less likely to be rapidly dried in the first drying chamber 21. This can restrain the occurrence of migration resulting from rapid drying of the coating layer 5.

Specifically, the coating layer 5 of the coated foil 2 is made of a paste-like coating solution prepared in such a way that a plurality of active materials (a positive active material for the electrode 1 being positive electrode or a negative active material for the electrode 1 being a negative electrode), a binder resin for binding the active materials to each other and binding the active material to the metal foil 3, and others are mixed in a solvent (water or organic solvent) before the coating process. When the coated foil 2 (the coating layer 5) enters the drying oven 20 under a heated atmosphere, the solvent contained in the coating layer 5 evaporates and thus the concentration of solvent in the first drying chamber 21 is gradually increased due to the evaporated solvent. Then, the atmosphere in the first drying chamber 21 approaches the saturated state.

On the other hand, when the coated foil 2 enters the drying oven 20 under a heated atmosphere, as the solvent contained in the coating layer 5 evaporates, the binder resin binds the active materials to each other and binds the active materials to the metal foil 3. Thus, the dried coating layer 5 is obtained.

When the coated foil 2 first passes through the first drying chamber 21, the solvent existing in the coating layer 5 on the front surface 5a side begins evaporating and thus the concentration of the solvent on the front surface 5a side gradually decreases. In contrast, the concentration of the solvent existing in the coating layer 5 on the back surface 5b side and near the interface between the coated surface 3a of the metal foil 3 and the back surface 5b of the coating layer 5 in the thickness direction of the coating layer 5 remains close to an initial concentration given before the coated foil 2 enters the first drying chamber 21. Accordingly, a difference in solvent concentration occurs between the front surface 5a side and the back surface 5b side.

When the coating layer 5 is dried at a rapid drying speed that causes a large difference in solvent concentration in a short time, the solvent remaining in the coating layer on the back surface 5b side is likely to rapidly evaporate under the atmosphere in the drying chamber. In association with this rapid evaporation of solvent, the binder resin existing in the coating layer on the back surface 5b side also moves toward the front surface 5a side. When the solvent remaining in the coating layer 5 on the back surface 5b side finishes evaporating, the binder resin having moved to the front surface 5a side is solidified on the front surface 5a side. In the coating layer 5, therefore, migration is caused by the binder resin between the front surface 5a side and the back surface 5b side. The occurrence of migration deteriorates the bonding strength between the metal foil 3 and the coating layer 5 (active materials and others), particularly, in the interface between the coated surface 3a of the metal foil 3 and the back surface 5b of the coating layer 5.

In the electrode manufacturing method in the present embodiment, the concentration of the solvent that evaporates in air in the first drying chamber 21 is higher than the concentration of the solvent that evaporates in air in the second drying chamber 22. In the first drying chamber 21, as the solvent concentration of evaporated solvent is higher, the solvent atmosphere in the chamber becomes saturated in a shorter time. In the first drying chamber 21, from this saturated state, the solvent remaining in the coating layer 5 is prevented from evaporating from the front surface 5a of the coating layer 5. Accordingly, the lowering of concentration of the solvent remaining in the coating layer 5 on the front surface 5a side is reduced. The concentration of solvent remaining on the back surface 5b side is also easily maintained close to an initial concentration given before the coated foil 2 enters the first drying chamber 21. Even when the coated foil 2 enters the first drying chamber 21, therefore, a difference between the concentration of the solvent remaining in the coating layer 5 on the front surface 5a side and the concentration of the solvent remaining on the back surface 5b side can be reduced.

As above, since the difference in solvent concentration is reduced between the front surface 5a side and the back surface 5b side of the coating layer 5, the coating layer 5 of the coated foil 2 fed into the first drying chamber 21 can be dried at a slow drying speed. This can prevent the binder resin in the coating layer 5 on the back surface 5b side from moving toward the front surface 5a side as the solvent remaining on the back surface 5b side rapidly evaporates. Specifically, it is possible to prevent the occurrence of migration in the coating layer 5 that is caused when the binder resin moved to the front surface 5a side is solidified by rapid evaporation of the solvent remaining in the coating layer 5 on the back surface 5b side. Thus, a decrease in the bonding strength between the metal foil 3 and the coating layer 5 (active materials and others) can be restrained.

Even when the coated foil 2 passes through the first drying chamber 21 under the heated atmosphere, the moist coating layer 5 is less likely to be dried rapidly in the first drying chamber 21. This can prevent the occurrence of migration resulting from rapid drying of the coating layer. In particular, the electrode manufacturing method of the present embodiment can prevent the occurrence of migration irrespective of which the electrode 1 is a positive electrode or a negative electrode and irrespective of the kind of solvent.

Furthermore, the first drying chamber 21 is designed to have the smaller area of the cross section S1 than the area of the cross section S2 of the second drying chamber 22 without setting the interior length in the feed direction F to be shorter than the interior length of at least the second drying chamber 22 to provide the smaller volume V1 than the volume V2 of at least the second drying chamber 22. This can avoid a situation that the time to pass the coated foil 2 through the first drying chamber 21 is shorter than the time needed to effectively heat the coating layer 5. Efficient heating and drying of the coating layer 5 can therefore be conducted.

Conventionally, the coating layer is moisturized and then dried by hot air to prevent migration. The drying machine thus needs a humidifier in addition to the drying oven and also requires complicated control of the temperature and humidity in the drying machine during drying of the coating layer. In contrast, the electrode manufacturing method of the present embodiment does not need to humidify the coating layer 5. For instance, it is only necessary to control the temperature of the first drying chamber 21. Thus, the control needed to dry the coating layer 5 is not complicated. Since the coating layer 5 does not have to be humidified, the drying machine 10 needing no humidifier can be reduced in size, needing no extra cost for humidification, thus enabling drying of the coating layer 5 at low cost.

According to the electrode manufacturing method of the present embodiment, consequently, it is possible to manufacture the electrode 1 at low cost by efficiently drying the coated foil 2 consisting of the metal foil 3 applied with the paste-like coating material 4 while preventing the occurrence of migration.

Furthermore, in the electrode manufacturing method of the present embodiment, the coating material 4 contains the solvent and the first drying chamber 21 provides an atmosphere in which the concentration of the solvent that evaporates from the coated foil 2 is close to a saturated state. Accordingly, it is possible to restrain evaporation of the solvent from the front surface 5a while the coated foil 2 is passing through the first drying chamber 21, so that the coated foil 2 can be moved forward into the second drying chamber 22 with the coating layer 5 internally containing the remaining solvent.

According to the electrode manufacturing method of the present embodiment, in the first drying chamber 21, the coated foil 2 is heated by the infrared heaters 31 under the atmosphere supplied with no hot air. When the coating layer 5 is heated by absorbing the infrared rays emitted from the infrared heaters 31, the front surface 5a and the inside of the coating layer 5 can be heated with uniform temperature distribution and thus the coating layer 5 can be uniformly preheated.

According to the electrode manufacturing method of the present embodiment, in the second drying chamber 22 and subsequent drying chamber(s) (e.g., the third drying chamber 23), the coated foil 2 is exposed to an atmosphere in which hot air HF is supplied. In the case where the coated foil 2 is dried in the drying oven 20 in which the first drying chamber 21 is set to the atmosphere heated at a high temperature exceeding 300° C. and the second drying chamber 22 is set to an atmosphere supplied with hot air HF at about 100° C. as in the present embodiment, when the hot air HF is supplied in the second drying chamber 22 and corresponding exhaust air EG is exhausted from the second drying chamber 22, the internal pressure $P_2i$ of the second drying chamber 22 becomes lower than the internal pressure $P_1i$ of the first drying chamber 21 which no hot air is supplied in and no exhaust air EG is exhausted from.

When a solvent is exposed to a low-pressure atmosphere, the solvent is easy to evaporate for its property. Accordingly, when the coated foil 2 (coating layer 5) uniformly preheated by the high-temperature infrared heaters 31 in the first drying chamber 21 while restraining evaporation of the remaining solvent is allowed to pass through the second drying chamber 22 lower in temperature and lower in pressure than the first drying chamber 21, moisture of the solvent remaining in the coating layer 5 can be gradually removed from the front surface 5a of the coating layer 5 up to the inside thereof at a slower drying speed than a rapid drying speed that causes migration. It is therefore possible to prevent the occurrence of migration and efficiently dry the coating layer 5.

According to the electrode manufacturing method of the present embodiment, the backup roller 61 placed in contact with the metal foil 3 and the feed roller 62 placed in contact with the coated foil 2, which are the rollers used for feeding, are heated by the exhaust heat HT deriving from the exhaust air EG exhausted from the drying chambers (the second to fourth drying chambers 22-24) supplied with the hot air HF. Thus, the coated foil 2 is preheated by the heat stored in the backup roller 61 and the feed roller 62. Accordingly, as in the present embodiment, when the exhaust heat HT is transmitted from the core members of the backup roller 61 and the feed roller 62 to their outer peripheral surfaces and stored in the backup roller 61 and the feed roller 62, the heat stored in each roller is transmitted to the metal foil 3 contacting with the backup roller 61 during the coating process and to the coated foil 2 contacting with the feed roller 62 after the coating process, thereby warming the coating layer 5 during feeding of the coated foil 2.

At that time, the backup roller 61 and the feed roller 62 are rotated while directly contacting with the uncoated surface 3b of the metal foil 3 or the surface of the coated foil 2 (i.e., the uncoated surface 3b of the metal foil 3) opposite to the front surface 5a of the coating layer 5. Therefore, the heat stored in the backup roller 61 and the feed roller 62 is uniformly transmitted respectively to the entire uncoated surface 3b of the metal foil 3 immediately before coating and the coating layer 5 of the coated foil 2 after coating, so that the formed coating layer 5 can be heated evenly in its planar direction. Thus, by the heat stored in the backup roller 61 and the feed roller 62 in addition to the heat applied to the coating layer 5 from above the front surface 5a side in the first drying chamber 21, the coating layer 5 is heated from both sides, i.e., above the front surface 5a and below the opposite back surface 5b. Accordingly, the coating layer 5 is efficiently uniformly preheated in its thickness direction (an up-and-down direction in FIG. 2) and planar direction (a direction perpendicular to the drawing sheet of FIG. 2). This can prevent one-way progression of drying of the coating layer 5 from the front surface 5a.

In the electrode manufacturing method of the present embodiment, the differential pressure between the internal pressure $P_1i$ inside the first drying chamber 21 and the external pressure $P_1o$ outside and upstream adjacent to the first drying chamber 21 is zero, and the internal pressure $P_1i$ of the first drying chamber 21 is higher than the external pressure $P_1o$ in the range of allowable error. It is therefore possible to prevent the outside air of the first drying chamber 21 from flowing in the first drying chamber 21 through the opening on the upstream side of the first drying chamber 21 and on the feeding path of the coated foil 2. Therefore, the concentration of evaporated solvent in the drying chamber 21 does not lower temporarily due to inflow of the outside air. Thus, the saturated state is easily rapidly achieved. Because of no inflow of outside air, preheating the coated foil 2 can be promoted.

Specifically, the outside air of the first drying chamber 21 has a lower solvent concentration than the concentration of the solvent evaporated in the first drying chamber 21 and further has a lower temperature than that of the internal atmosphere of the first drying chamber 21. When the outside air flows in the first drying chamber 21, the concentration of the solvent evaporated in the first drying chamber 21 is decreased than before the inflow of air and gets away from the concentration corresponding to the saturated state. If the low-temperature outside air flows in the first drying chamber 21, the atmosphere temperature of the first drying chamber 21 is also decreased. Thus, the evaporation of the solvent remaining in the coated foil 2 advances, and rapid drying of the coating layer 5 cannot be sufficiently restrained. In addition, the low-temperature outside air disturbs the preheating of the coating layer 5, resulting in poor quality of the coating layer 5.

The aforementioned embodiment is a mere example and does not give any limitations to the invention. Thus, the present invention may be embodied in other specific forms without departing from the essential characteristics thereof.

Figure 8:
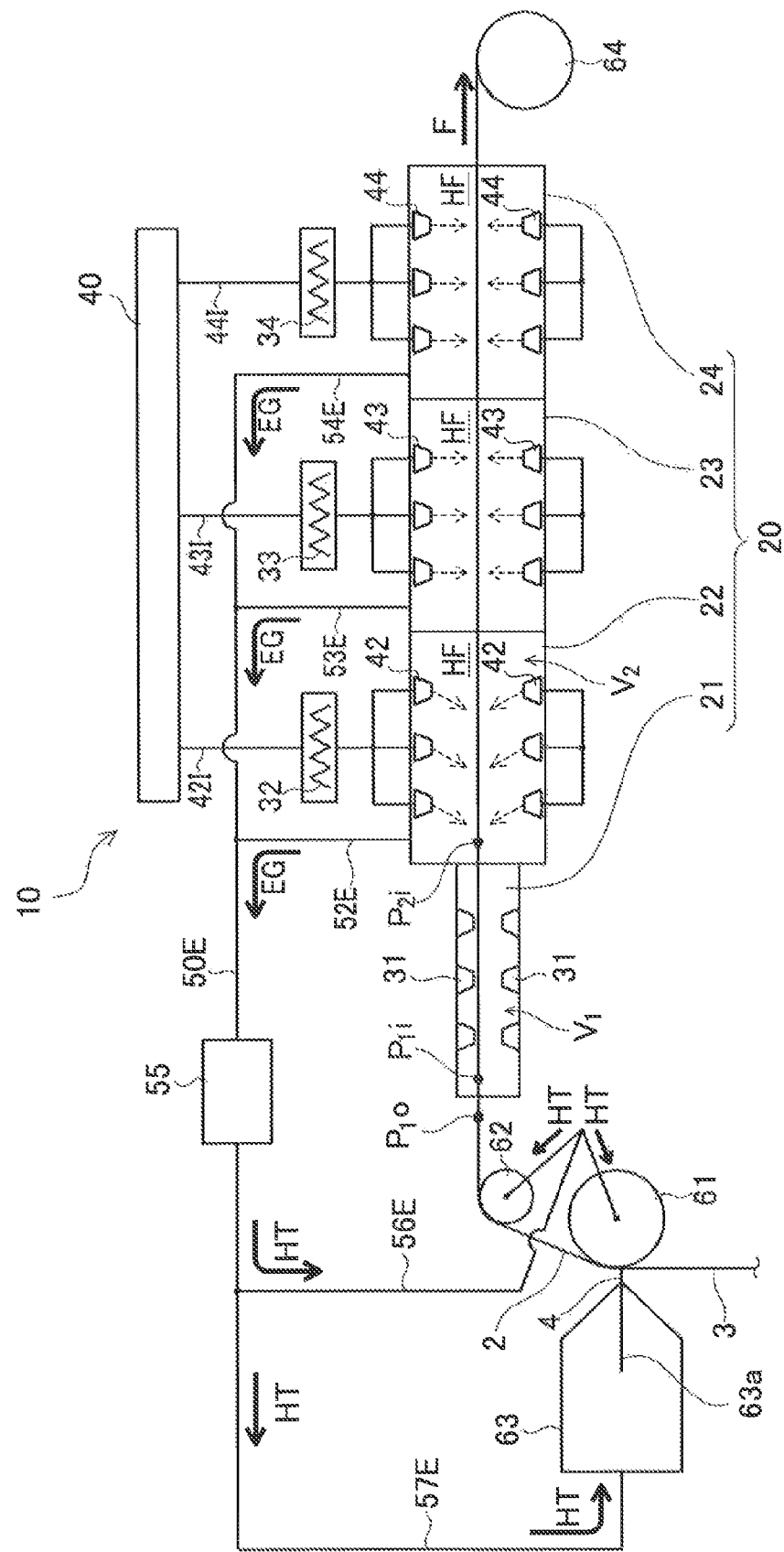
FIG. 8 is a schematic diagram to explain a modified example of the electrode manufacturing method.
Figure 9:
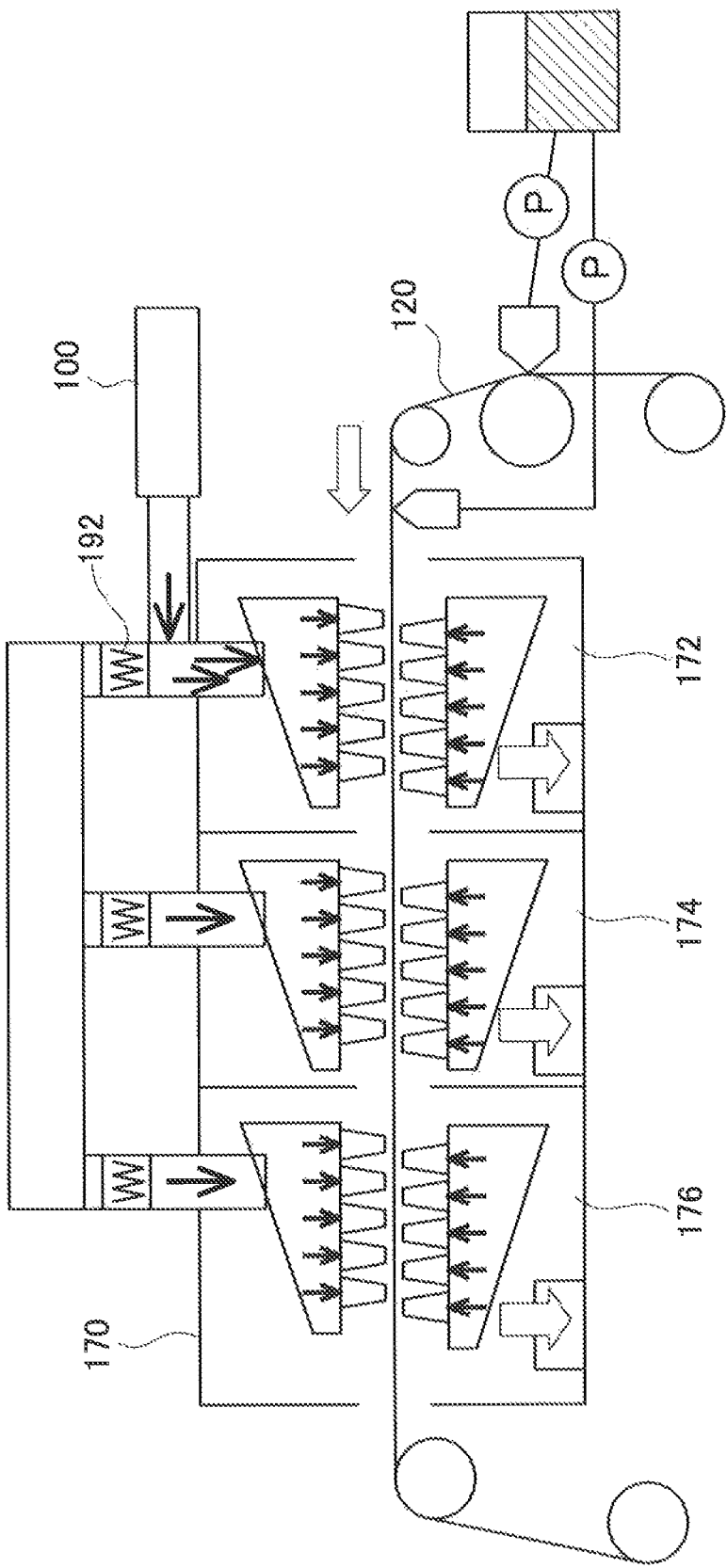
FIG. 9 is a schematic diagram to explain a drying step in a related art.

In the above embodiment, as shown in FIG. 1, the position of the feeding path of the coated foil 2 is located at the middle in the height direction (an up-and-low direction in FIG. 1) in each of the first to fourth drying chambers 21-24, so that the coating layer 5 is heated equally and dried from both sides, above and below. In addition, in the first drying chamber 21, the coated foil 2 (coating layer 5) is heated by the infrared heaters 31 at a high temperature of 300° C. or more. FIG. 8 is a schematic diagram to explain a modified example of the electrode manufacturing method.

In this modified example, as also briefly mentioned in Example 6 described above, the position of the feeding path of the coated foil 2 is located to the upper side in the height direction (an up-and-low direction in FIG. 3) in the first drying chamber 21 as shown in FIG. 8, so that the front surface 5a of the coating layer 5 is positioned closer to the infrared heaters 31 than in the above embodiment. In the first drying chamber 21, accordingly, the temperature to heat the coated foil 2 (coating layer 5) by the infrared heaters 31 can be set to a relatively low temperature such as about 150° C. In the first drying chamber 21, it is of course essential that the internal pressure $P_1i$ is equal to the external pressure $P_1o$ or the internal pressure $P_1i$ is higher by for example about 5 Pa than the external pressure $P_1o$. In the second drying chamber 22, it is essential that the internal pressure $P_2i$ is equal to the external pressure $P_1o$ or the internal pressure $P_2i$ is lower by for example about 20 Pa than the external pressure $P_1o$. Furthermore, as shown in FIGS. 1 and 8, since the exhaust heat HT from the heat exchanger 55 is transmitted to the die 63 as well as the backup roller 61 and the feed roller 62 through the exhaust heat path 57E, it can contribute to uniformly heating the coating layer 5.

INDUSTRIAL APPLICABILITY

According to the electrode manufacturing method of the invention can manufacture an electrode at low cost in such a way that a coated foil consisting of a metal foil applied with a paste-like coating material is efficiently dried while restraining the occurrence of migration.

REFERENCE SIGNS LIST

1 Electrode
2 Coated foil
3 Metal foil
4 Coating material
10 Drying machine
20 Drying oven
21 First drying chamber
22 Second drying chamber
23 Third drying chamber
24 Fourth drying chamber
31 Infrared heater
61 Backup roller
62 Feed roller
S1 Cross section of First drying chamber
S2 Cross section of Second drying chamber
V1 Volume of First drying chamber
V2 Volume of Second drying chamber
HF Hot air
EG Exhaust air
F Feed direction
$P_1i$ Internal pressure of First drying chamber
$P_1o$ External pressure of First drying chamber

What is claimed is:
1. An electrode manufacturing method including:
a coating process of applying a coating material to a metal foil while the metal foil is fed forward to form a coated foil; and
a drying process of drying the coated foil by heating while the coated foil is fed forward to pass through a drying oven of a drying machine placed in line on a feeding path,
wherein the drying oven includes a plurality of drying chambers partitioned at a plurality of positions, the drying chambers including at least a first drying chamber which the coated foil first passes through in the drying process and a second drying chamber which the coated foil passes through following the first drying chamber, the first drying chamber has a smaller area in cross section perpendicular to the feed direction along the feeding path than an area of the second drying chamber to provide a smaller volume of the first drying chamber than a volume of the second drying chamber, the first drying chamber has a smaller cross sectional area than a cross sectional area of the second chamber without setting an interior length in the feed direction to be shorter than an interior length of at least the second drying chamber to provide that the ratio of the volume of the first drying chamber to the volume of the second drying chamber is set to 60% or less, in the first drying chamber, the coated foil is heated only by an infrared heater under an atmosphere in which no heated air is supplied, and an atmosphere temperature in the first drying chamber is higher than an atmosphere temperature in the second drying chamber.

2. The electrode manufacturing method according to claim 1, wherein the coating material contains a solvent, and the first drying chamber provides an atmosphere in which a concentration of the solvent that evaporates from the coated foil is close to a saturated state.

3. The electrode manufacturing method according to claim 2, wherein a differential pressure between internal pressure inside the first drying chamber and external pressure outside and upstream adjacent to the first drying chamber is zero, or the internal pressure of the first drying chamber is higher than the external pressure.

4. The electrode manufacturing method according to claim 2, wherein in the second and subsequent drying chambers, the coated foil is exposed to an atmosphere in which hot air at about 100° C. is supplied.

5. The electrode manufacturing method according to claim 4, wherein a differential pressure between internal pressure inside the first drying chamber and external pressure outside and upstream adjacent to the first drying chamber is zero, or the internal pressure of the first drying chamber is higher than the external pressure.

6. The electrode manufacturing method according to claim 4, wherein a roller is used for feeding the metal foil, the roller being placed in contact with at least one of the coated foil and the metal foil, and the roller is heated by exhaust air exhausted from the drying chamber supplied with the hot air at about 100° C., and the coated foil is preheated by heat stored in the heated roller.

7. The electrode manufacturing method according to claim 6, wherein a differential pressure between internal pressure inside the first drying chamber and external pressure outside and upstream adjacent to the first drying chamber is zero, or the internal pressure of the first drying chamber is higher than the external pressure.

8. The electrode manufacturing method according to claim 1, wherein in the second and subsequent drying chambers, the coated foil is exposed to an atmosphere in which hot air at about 100° C. is supplied.

9. The electrode manufacturing method according to claim 8, wherein a differential pressure between internal pressure inside the first drying chamber and external pressure outside and upstream adjacent to the first drying chamber is zero, or the internal pressure of the first drying chamber is higher than the external pressure.

10. The electrode manufacturing method according to claim 8, wherein a roller is used for feeding the metal foil, the roller being placed in contact with at least one of the coated foil and the metal foil, and the roller is heated by exhaust air exhausted from the drying chamber supplied with the hot air at about 100° C., and the coated foil is preheated by heat stored in the heated roller.

11. The electrode manufacturing method according to claim 10, wherein a differential pressure between internal pressure inside the first drying chamber and external pressure outside and upstream adjacent to the first drying chamber is zero, or the internal pressure of the first drying chamber is higher than the external pressure.

12. The electrode manufacturing method according to claim 1, wherein a differential pressure between internal pressure inside the first drying chamber and external pressure outside and upstream adjacent to the first drying chamber is zero, or the internal pressure of the first drying chamber is higher than the external pressure.

* * * * *